(12) United States Patent
Zotov et al.

(10) Patent No.: US 9,013,438 B2
(45) Date of Patent: Apr. 21, 2015

(54) TOUCH INPUT DATA HANDLING

(71) Applicant: Microsoft Technology Licensing, LLC, Redmond, WA (US)

(72) Inventors: Alexander J Zotov, Sammamish, WA (US); Reed L Townsend, Seattle, WA (US); Steven P Dodge, Sammamish, WA (US); Bryan D Scott, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/293,528

(22) Filed: Jun. 2, 2014

(65) Prior Publication Data

US 2014/0285457 A1 Sep. 25, 2014

Related U.S. Application Data

(63) Continuation of application No. 13/041,595, filed on Mar. 7, 2011, now Pat. No. 8,816,971, which is a continuation of application No. 11/419,496, filed on May 21, 2006, now Pat. No. 7,928,964, which is a continuation-in-part of application No. 11/246,567, filed on Oct. 11, 2005, now Pat. No. 7,986,307.

(60) Provisional application No. 60/673,771, filed on Apr. 22, 2005.

(51) Int. Cl.
*G06F 3/041* (2006.01)
*G06F 3/0354* (2013.01)

(52) U.S. Cl.
CPC .............. *G06F 3/041* (2013.01); *G06F 3/0416* (2013.01); *G06F 3/03545* (2013.01)

(58) Field of Classification Search
USPC .......... 345/173–184; 178/18.01, 18.02, 18.03
See application file for complete search history.

(56) References Cited

U.S. PATENT DOCUMENTS

| | | | |
|---|---|---|---|
| 4,145,748 | A | 3/1979 | Eichelberger et al. |
| 5,241,139 | A | 8/1993 | Gungl et al. |
| 5,313,051 | A | 5/1994 | Brigida et al. |
| 5,425,110 | A | 6/1995 | Spitz |
| 5,517,578 | A | 5/1996 | Altman et al. |
| 5,734,377 | A | 3/1998 | Fukuzaki |
| 5,757,362 | A | 5/1998 | Levine |
| 5,784,504 | A | 7/1998 | Anderson et al. |
| 5,889,523 | A | 3/1999 | Wilcox et al. |

(Continued)

FOREIGN PATENT DOCUMENTS

WO WO 2001/067222 A2 9/2001

OTHER PUBLICATIONS

"About Ink Analysis with the Divider Object", Microsoft Developers' Network msdn, Online, Jan. 2003, 1-8.

(Continued)

*Primary Examiner* — Dmitriy Bolotin
(74) *Attorney, Agent, or Firm* — Henry Gabryjelski; Raghu Chinagudabha; Micky Minhas

(57) ABSTRACT

A system for enabling a tablet input object is described. A tablet input object can take various inputs from touch, a mouse, and a pen and sends their information to an application or operating system. Also, a pen message pathway may also be used to handle touch messages, thereby reusing an existing pen message pathway for messages created by something other than a pen.

16 Claims, 9 Drawing Sheets

(56) References Cited

U.S. PATENT DOCUMENTS

| | | | |
|---|---|---|---|
| 5,892,843 | A | 4/1999 | Zhou et al. |
| 5,903,668 | A | 5/1999 | Beernink |
| 5,956,020 | A | 9/1999 | D'Amico et al. |
| 6,035,063 | A | 3/2000 | Nakashima et al. |
| 6,297,811 | B1 | 10/2001 | Kent et al. |
| 6,310,610 | B1 * | 10/2001 | Beaton et al. ............ 345/173 |
| 6,615,287 | B1 | 9/2003 | Behrens et al. |
| 7,050,632 | B2 | 5/2006 | Shilman et al. |
| 7,218,779 | B2 | 5/2007 | Dodge et al. |
| 7,834,855 | B2 | 11/2010 | Hotelling et al. |
| 7,847,789 | B2 * | 12/2010 | Kolmykov-Zotov et al. . 345/173 |
| 7,928,964 | B2 * | 4/2011 | Kolmykov-Zotov et al. . 345/173 |
| 7,986,307 | B2 * | 7/2011 | Zotov et al. ............... 345/173 |
| 8,803,824 | B2 * | 8/2014 | Zotov et al. ............... 345/173 |
| 8,816,971 | B2 * | 8/2014 | Kolmykov-Zotov et al. . 345/173 |
| 2002/0033795 | A1 * | 3/2002 | Shahoian et al. .......... 345/156 |
| 2002/0057263 | A1 * | 5/2002 | Keely et al. ............... 345/179 |
| 2002/0080123 | A1 * | 6/2002 | Kennedy et al. ........... 345/173 |
| 2002/0186676 | A1 * | 12/2002 | Milley et al. .............. 370/341 |
| 2002/0190959 | A1 | 12/2002 | Nagao |
| 2003/0007683 | A1 | 1/2003 | Wang et al. |
| 2003/0076307 | A1 | 4/2003 | Krajewski et al. |
| 2003/0080946 | A1 | 5/2003 | Chuang |
| 2003/0215140 | A1 | 11/2003 | Gounares et al. |
| 2004/0064627 | A1 | 4/2004 | Shah et al. |
| 2005/0017947 | A1 * | 1/2005 | Shahoian et al. .......... 345/156 |
| 2005/0052430 | A1 * | 3/2005 | Shahoian et al. .......... 345/173 |
| 2005/0083313 | A1 | 4/2005 | Hardie-Bick |
| 2006/0109252 | A1 * | 5/2006 | Kolmykov-Zotov et al. . 345/173 |
| 2006/0209016 | A1 | 9/2006 | Fox et al. |
| 2006/0244735 | A1 * | 11/2006 | Wilson ...................... 345/173 |
| 2006/0267957 | A1 * | 11/2006 | Kolmykov-Zotov et al. . 345/173 |
| 2006/0267958 | A1 * | 11/2006 | Kolmykov-Zotov et al. . 345/173 |
| 2006/0282574 | A1 * | 12/2006 | Zotov et al. ............... 710/62 |
| 2009/0088216 | A1 | 4/2009 | Pichler et al. |
| 2011/0157062 | A1 * | 6/2011 | Kolmykov-Zotov et al. . 345/173 |
| 2011/0216028 | A1 * | 9/2011 | Zotov et al. ............... 345/173 |

OTHER PUBLICATIONS

Aref et al., "On Handling Electronic Ink", ACM Computing Surveys (CSUR), Dec. 1995, 27(4), 564-567.

Clergeau-Tournemire et al., "Integration of Lexical and Syntactical Knowledge in a Handwriting-Recognition System", Machine Vision and Applications, 1995, 8(4), 249-259.

European Search Report for EP 03026274, dated May 19, 2004, 3 pages.

Govindaraju et al., "Handwritten Text Recognition", Int'l Assn. for Pattern Recognition Workshop on Document Analysis Systems, 1995, 288-304.

Kim et al., "An Architecture for Handwritten Text Recognition Systems", International Journal on Document Analysis and Recognition, 1999, 2(1), 37-44.

Leibs, "The Light Stuff", CFO Magazine, Jan. 1, 2003, 2 pages.

Lin et al., "Coarse Classification of On-Line Chinese Characters via Structure Feature-Based Method", Pattern Recognition, 1994, 27(10), 1365-1377.

Moran et al., "Pen-Based Interaction Techniques for Organizing Material on an Electronic Whiteboard", UIST '97: Proceedings of the 10th annual ACM symposium on User interface software and technology, Banff, Alberta, Canada, Oct. 14-17, 1997, 1-10.

Raafat et al., "A Tree Structured Neural Network", Proceedings of the Second International Conference on Document Analysis and Recognition, Tsukuba Science City, Japan, Oct. 20-22, 1993, 939-941.

Raghupathy, "Ink Parsing in Tablet PC", Microsoft Research Faculty Summit, Online, 2002, 1-7.

Shin, "Online Cursive Hangul Character Recognition Based on Dynamic Programming", Proceedings of Sixth International Conference on Document Analysis and Recognition, Seattle, WA, Sep. 10-13, 2001, 810-814.

Smithies et al., "Equation Entry and Editing via Handwriting and Gesture Recognition", Behaviour & Information Technology, Jan. 2001, 20(1), 1-23.

Srihari et al., "A System to Read Names and Addresses on Tax Forms", Proceedings of the IEEE, Jul. 1996, 84(7), 1038-1049.

Srihari et al., "Document Image-Processing System for Name and Address Recognition", International Journal of Imaging Systems and Technology, 1996, 7(4), 379-391.

In the United States Patent and Trademark Office, Non-Final Office Action in re: U.S. Appl. No. 11/419,496, filed May 21, 2006, Dated Mar. 13, 2009, 15 pages.

In the United States Patent and Trademark Office, Non-Final Office Action in re: U.S. Appl. No. 11/419,497, filed May 21, 2006, Dated Mar. 4, 2009, 12 pages.

In the United States Patent and Trademark Office: Non-Final Office Action in re: U.S. Appl. No. 11/419,496, filed May 21, 2006, Dated Mar. 13, 2009, 12 pages.

In the United States Patent and Trademark Office: Non-Final Office Action in re: U.S. Appl. No: 11/419,497, filed May 21, 2006, Dated Mar. 4, 2009, 9 pages.

In the United States Patent and Trademark Office: Final Office Action in re: U.S. Appl. No. 11/419,497, filed May 21, 2006, Dated Oct. 2, 2009, 11 pages.

In the United States Patent and Trademark Office: Non-Final Office Action in re: U.S. Appl. No. 11/246,567, filed Oct. 11, 2005, Dated Dec. 10, 2008, 10 pages.

In the United States Patent and Trademark Office: Non-Final Office Action in U.S. Appl. No. 11/246,567, filed Oct. 11, 2005, Dated Dec. 28, 2009, 17 pages.

In the United States Patent and Trademark Office: Final Office Action in U.S. Appl. No. 11/246,567, filed Oct. 11, 2005, Dated Jul. 8, 2009, 14 pages.

* cited by examiner

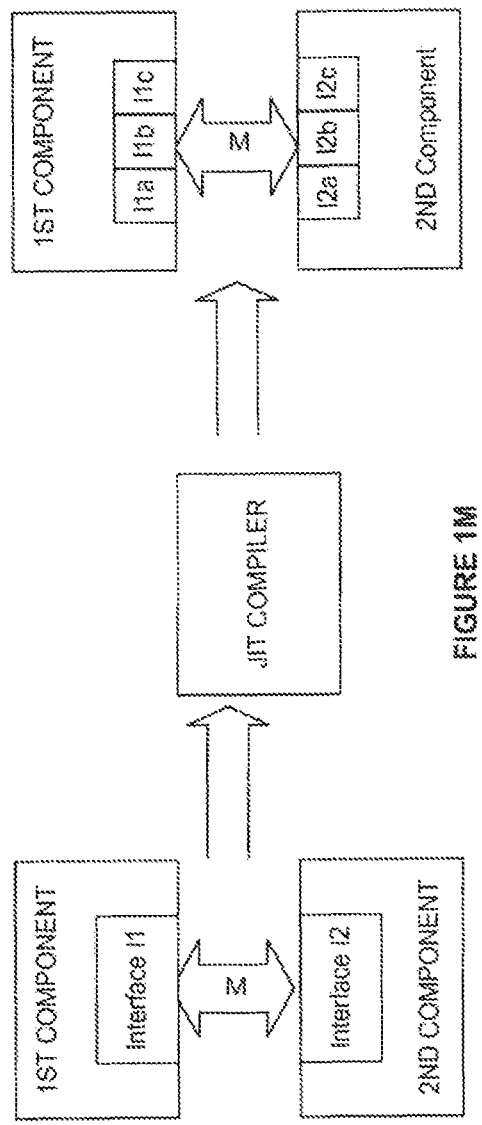

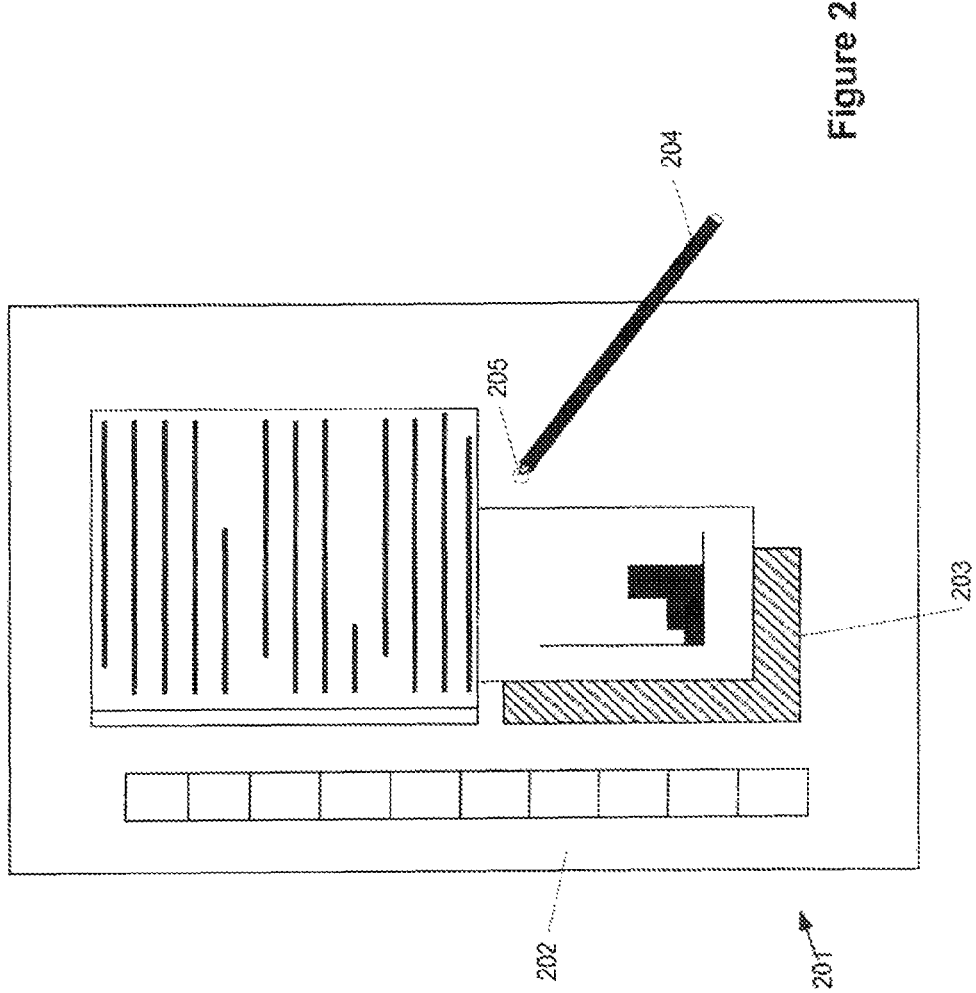

TOUCH INPUT DATA HANDLING

CROSS-REFERENCE TO RELATED APPLICATIONS

This patent application is a continuation of U.S. patent application Ser. No. 13/041,595, filed Mar. 7, 2011, entitled "TOUCH INPUT DATA HANDLING", which is a continuation of U.S. patent application Ser. No. 11/419,496, filed May 21, 2006, entitled "TOUCH INPUT DATA HANDLING," granted U.S. Pat. No. 7,928,964 on Apr. 19, 2011, which is a continuation-in-part of U.S. patent application Ser. No. 11/246,567, filed Oct. 11, 2005, entitled "MECHANISM FOR ALLOWING APPLICATIONS TO FILTER OUT OR OPT INTO TABLE INPUT," granted U.S. Pat. No. 7,986,307 on Jul. 26, 2011, which claims priority to U.S. Provisional Patent Application 60/673,771, filed Apr. 22, 2005, entitled "TOUCH INPUT APPLICATION PROGRAMMING INTERFACES," whose contents are expressly incorporated herein by reference.

TECHNICAL FIELD

This invention relates to computing, and more particularly to the field of touch in computing systems.

BACKGROUND

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

One aspect of stylus based computing is the use of touch input for use with stylus based computers. Some computing systems use a passive digitizer that responds to any type of contact (including a person's fingertip). Conventional computing systems do not provide programmatical access of touch input to control the behavior of systems. In short, developers need to write individualized code for each application to allow a user to use touch in place of mouse or keyboard input.

SUMMARY

Aspects of the present invention address one or more of the problems described above, thereby improving the use of touch in computing systems. An input type may be determined as well as intentional and accidental contact in an area. These and other aspects are set forth in greater detail below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures.

FIGS. 1B through 1M show a general-purpose computer environment supporting one or more aspects of the present invention.

FIG. 2 shows an illustrative example of a tablet computer in accordance with aspects of the present invention.

DETAILED DESCRIPTION OF ILLUSTRATIVE EMBODIMENTS

Figure 1A:
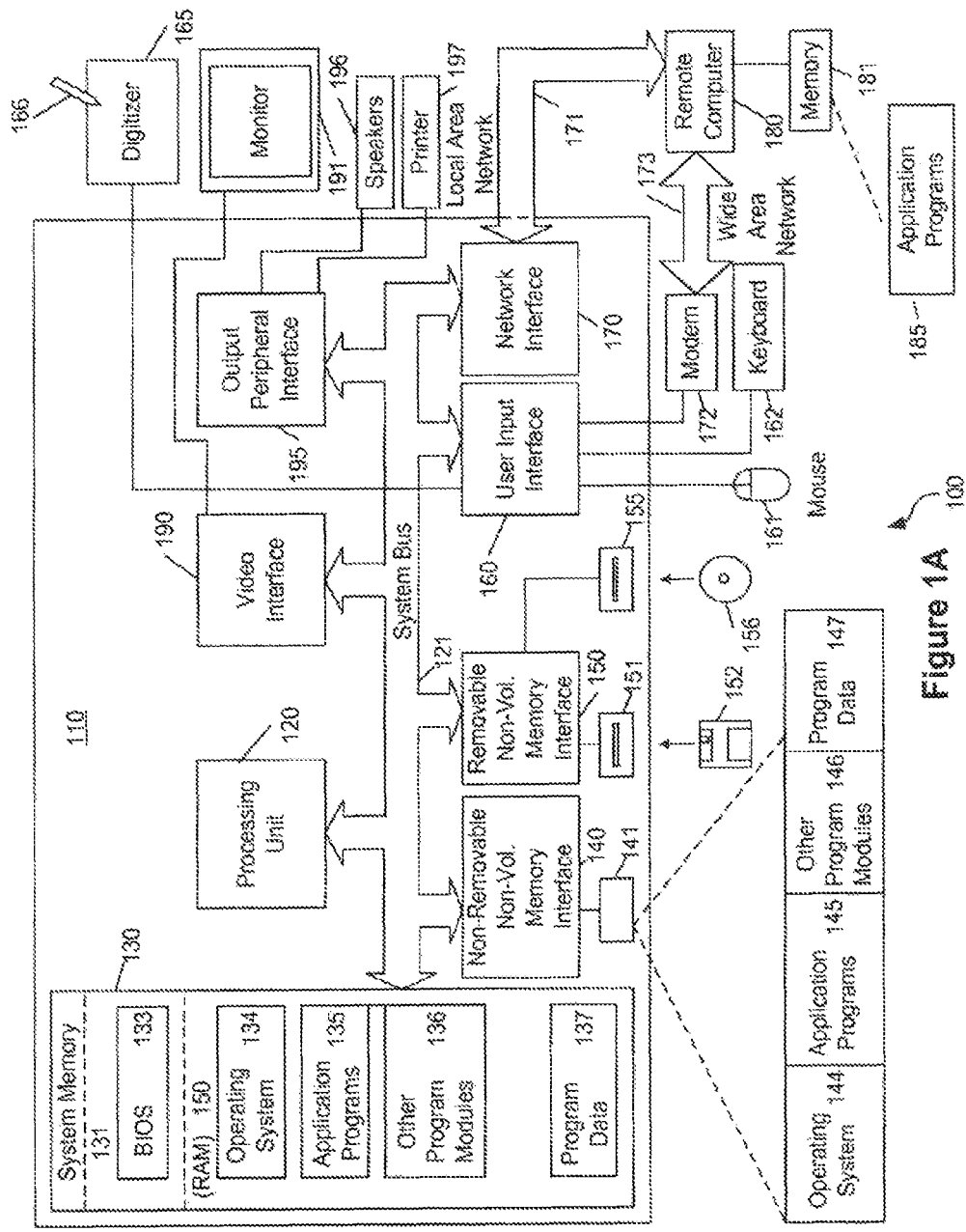
FIG. 1A illustrates a schematic diagram of a general-purpose digital computing environment in which certain aspects of the present invention may be implemented.

Aspects of the present invention relate to allowing programmatical access to computing systems to allow touch-based user input to function as other inputs.

This document is divided into sections to assist the reader. These sections include: overview, characteristics of ink, terms, general-purpose computing environment, pen-based computing platforms, tablet input techniques, touch APIs, and repurposing of ink APIs.

It is noted that various connections are set forth between elements in the following description. It is noted that these connections in general and, unless specified otherwise, may be direct or indirect and that this specification is not intended to be limiting in this respect.

Overview

Aspects of the present invention relate to providing a tablet input programmatical interface element or elements that allow touch input to be used as stylus-based input. In some aspects, touch-based events are provided with additional information to allow subsequent processing to handle the touch input as it were stylus-based or mouse-based input. Touch may include contact with a digitizer using a user's fingertip, finger nail, or the like. Further, in another aspect of the invention, the input using touch is another form of input. Access to touch data may be performed in various ways. In some situations, touch input may be treated as pen or stylus input when using, for instance, a fingernail or other small contact area of a person's finger.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discrete points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All other characteristics can be used as well.

Terms

| Term | Definition |
|---|---|
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, image files, and combinations thereof. |
| Render or Rendered or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |
| Computer storage media | |

General-Purpose Computing Environment

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball, pen, touch-based input (a person's finger and/or palm), or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including, for example, accelerometers, magnetometers, and gyroscopes.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
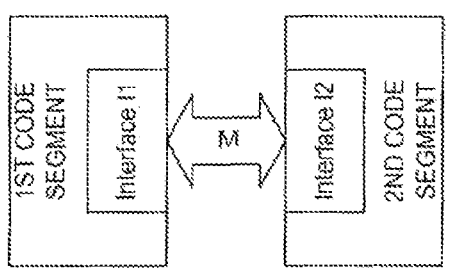
Figure 1E:
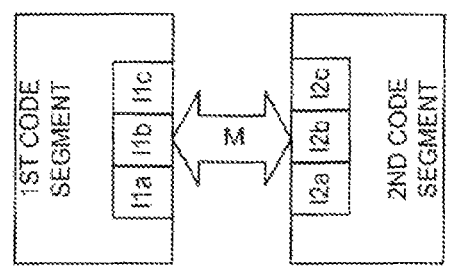
Figure 1B:
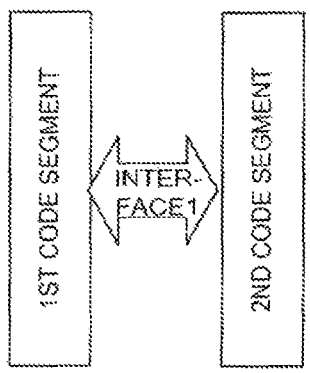

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
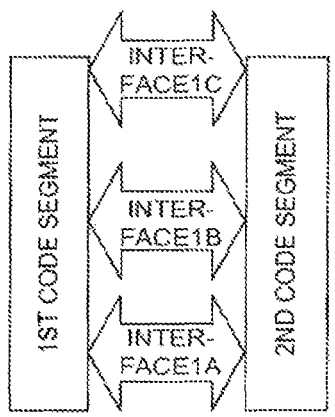

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
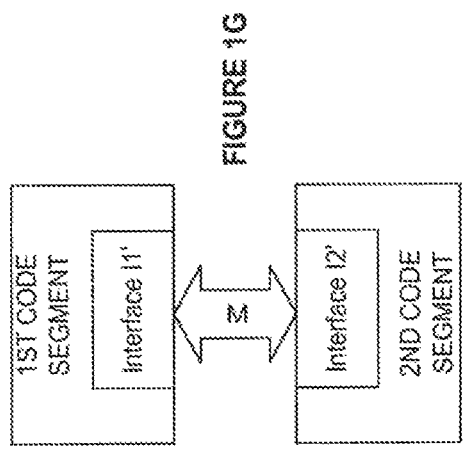
Figure 1G:
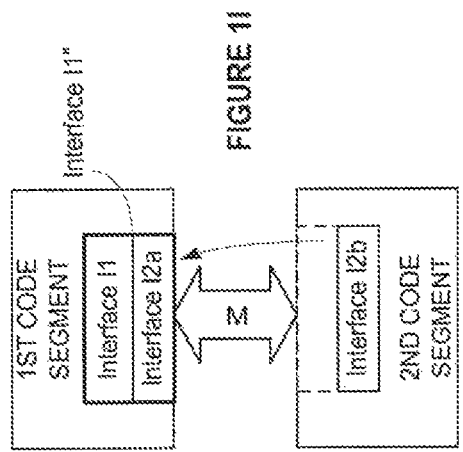

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, that multiplies the input parameter by itself in accordance with the precision parameter, outputting the result as the output parameter, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
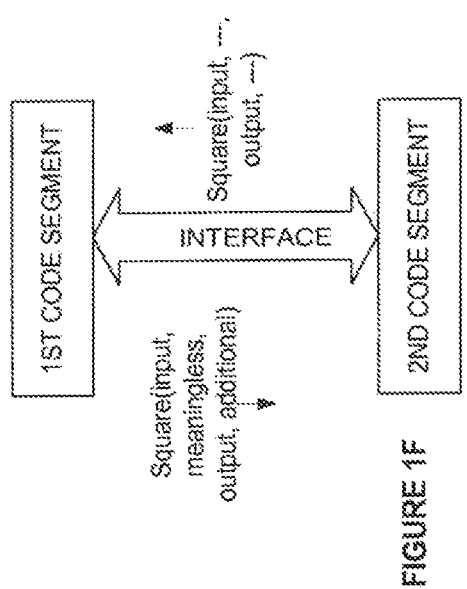
Figure 1I:
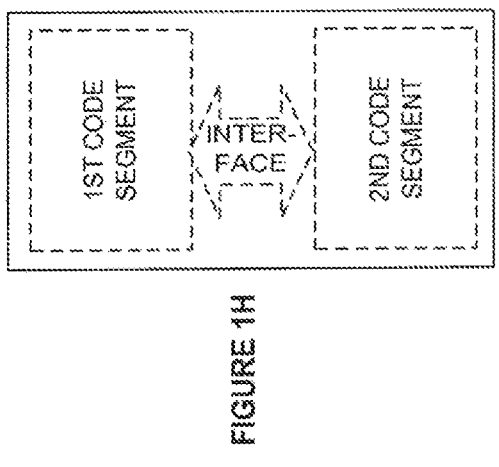

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
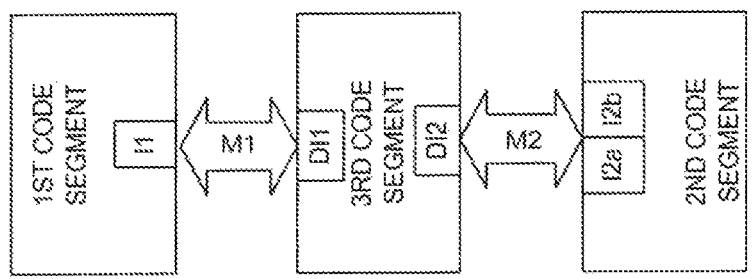
Figure 1J:
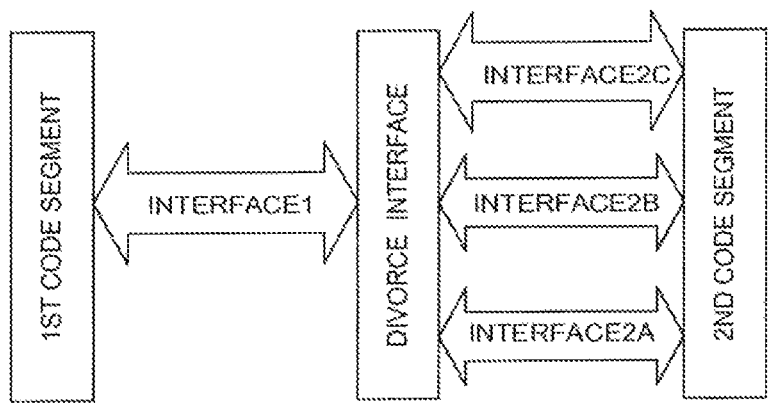

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
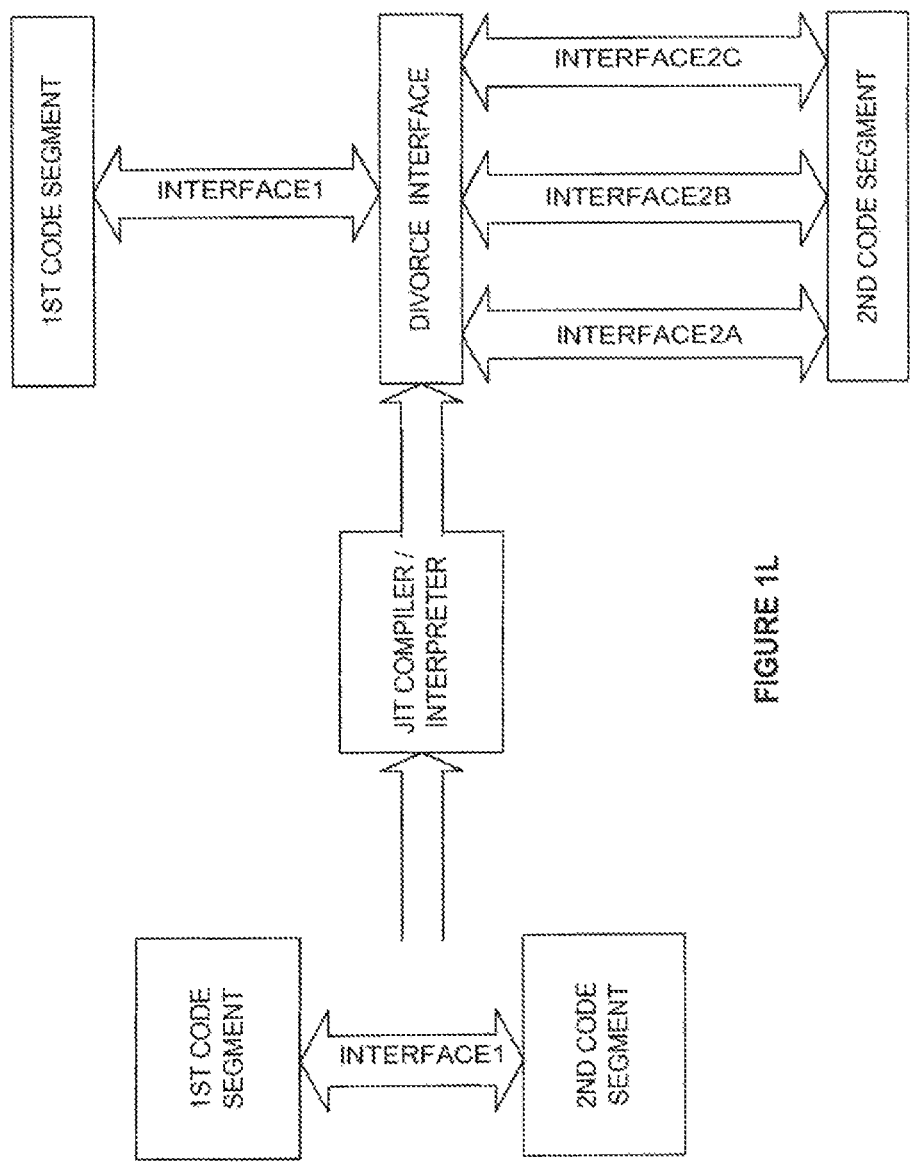

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Pen-Based Computing Platforms

FIG. 2 illustrates an illustrative tablet PC 201 that can be used in accordance with various aspects of the present invention. Any or all of the features, subsystems, and functions in the system of FIG. 1A can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as FinePoint or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like. Tablet PC 201 may also be a PDA, kiosk, telephone, television, and any pen-based computing platform.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when appropriate in the running application and moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Tablet Input Techniques

Figure 3:
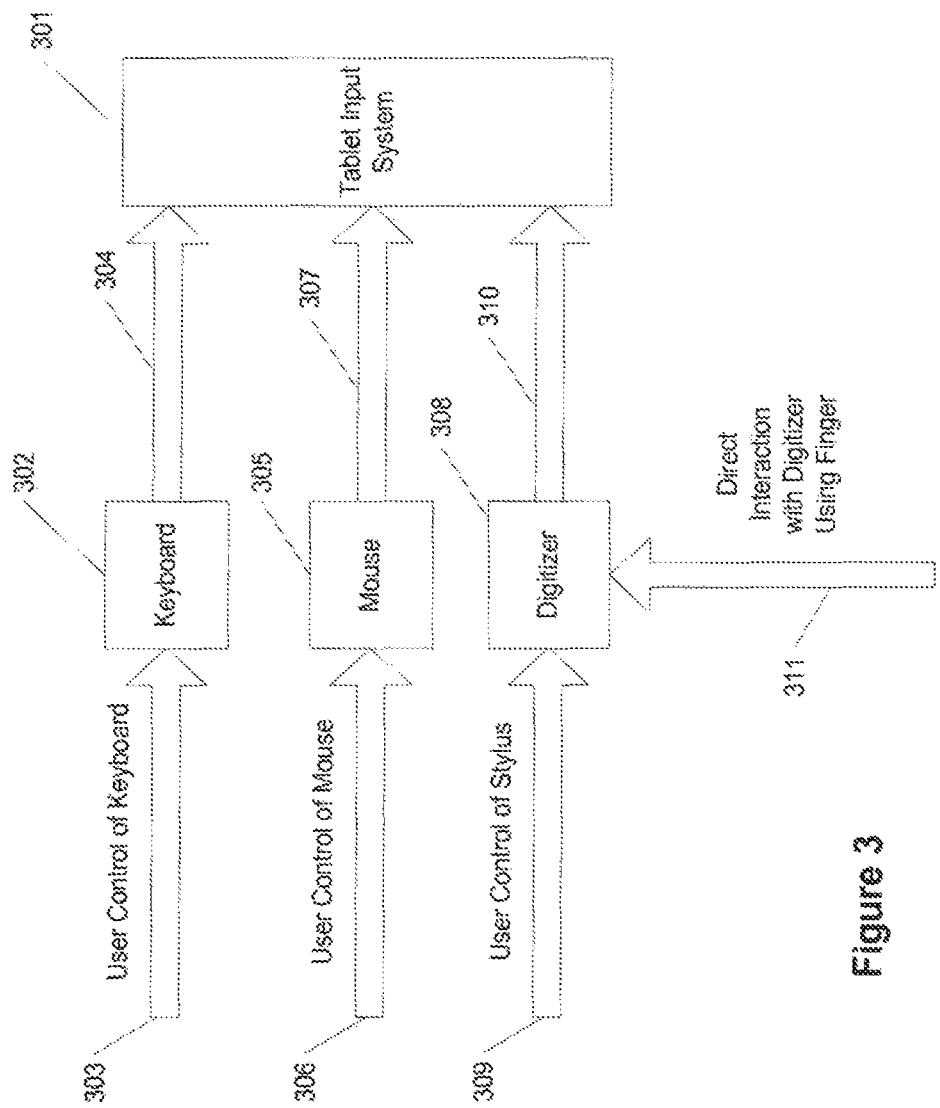
FIG. 3 shows various input techniques in accordance with aspects of the present invention.

FIG. 3 shows an example of various input techniques that may be used to provide user input to an application. Here, tablet input system 301 receives input from various sources. The sources may include a keyboard 302 that receives user interaction 303. The resulting keyboard output 304 is sent to and interpreted by tablet input system 301. A user may also control a mouse 305 (via clicking and moving the mouse 306) with the results outputted and interpreted by tablet input system 301. A user may further use a stylus to interact (309) with digitizer 308 that results in output 310 that is interpreted by tablet input system 301. Finally, here, the digitizer may also receive user input 311 in the form of direct user interaction with the digitizer using a finger. The resulting interaction may be sent to the tablet input system 301 along the same pathway 310 as that of a stylus-based input.

The tablet input system may be supported, for example, by a tablet input service. The tablet input service provides programmatic to input on stylus-enabled computing systems. The touch input may be combined with a stream from the digitizer relating to stylus input.

Some aspects of the present invention relate to providing easy programmatical access to common input functionality. This may be performed using a tablet input service object that exists on a client. The corresponding server object may exist in the ink services platform tablet input subsystem (commonly referred to as wisptis.exe). The service object and the client object may communicate over an Out of Process RPC (remote procedure call) via COM, for instance.

The tablet input service object may be instantiated in the client address space. The tablet input service object may create the server object in the ink services platform tablet input subsystem. The client object may forward calls to the server object.

Situations may exist where the server object is terminated. In this regard, all RPC calls to the server object may then fail when the ink services platform tablet input subsystem is terminated. The client process may then discard all internal references and cocreate a fresh copy of the server object. The COM would then restart the ink services platform tablet input subsystem via the tablet input service. The tablet input service can monitor the lifetime of the server object (startup, suspension, termination, and disconnection, for instance). The client side may then wait on a named event. This event may be signaled by a newly started instance of the ink services platform tablet input subsystem.

Figure 4:
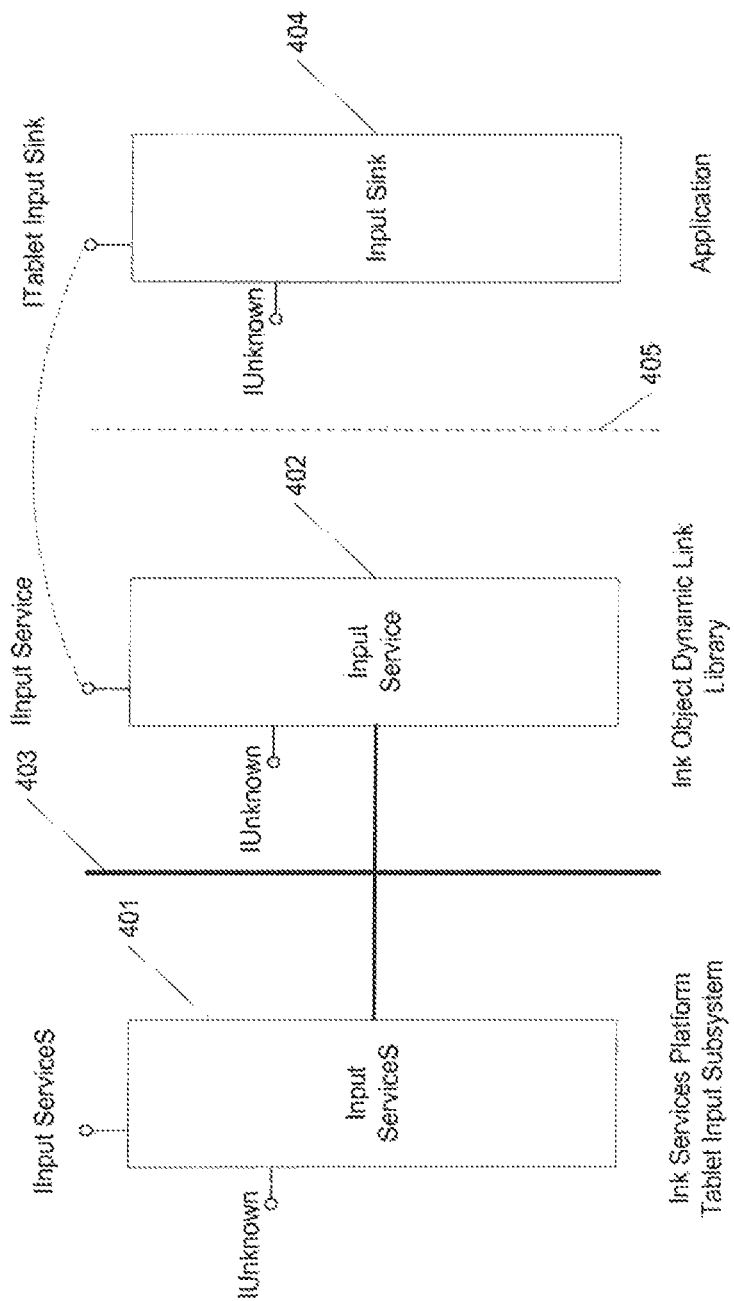
FIG. 4 shows an illustrative example of a tablet input object in accordance with aspects of the present invention.

FIG. 4 shows an example of the tablet input object and its relationships to other objects. The tablet object may exist as two components: a server side object 401 and a client side object 402. Here, an input service (server side) object 401 on the ink services platform tablet input subsystem receives information from a digitizer. The input service (server side) object 401 passes the received information to the input service (client side) object 402 resident in, for example, an ink dynamic link library over process boundary 403. The input service (client side) object 402 then exchanges information with an input sink 404 of an application (which is distinct from the input service object 402 as shown by separation 405). This exchange of information may occur in an out of process remote procedure call (RPC) between the IInputService interface of input service 402 and the ITabletInputSink interface for the input sink 404. Alternatively, RPCs can be used to handle some items (for instance, initial data exchange and handshaking) while a separate channel using a shared memory block exchanges other information.

Inking objects may become disconnected from the rest of the system. Inking objects may include a tablet, tablet context, cursor, buttons, and the like. These may need to be reconnected to the system. Here, the ink services platform tablet input subsystem may maintain state information (such as tablet context id, cursor id, etc). On reconnect, the client side object 402 may then establish the mapping between the old ids and the newly created ids in the ink services platform tablet input subsystem. An alternative solution, where the client side object 402 may notify applications to refresh these caches ids.

The tablet input object may define a number of different types of inputs including, but not limited to: no tablet input type, a mouse input type, a pen input type, and a touch input type. These may be represented as named values, for example explicitly as constants, in an enumeration data structure, or as named entities on an object, as appropriate for the programming language or protocol being used.

Other input types may also be used. For instance, another input type may be whether or not a digitizer is integrated with a display.

The tablet input object may include an enumeration of different types of broadcasts including at least one of broadcasting all, pen in range, pen out of range, and pen shake events. Here, this defines what will be sent when an event occurs.

The application programming interface allows an application developer a pathway of knowing what kind of physical contact is being initiated by the user (or a pathway of requiring a particular kind of interaction). The following lists various additional aspects to the API:

a. TabletInputType enumerates the kinds of input possible on the system. This may be utilized by an ITabletInputService implementation while evaluating how to process or direct a given input signal.

1. This enumeration may or may not also include a representation of whether Pen or Touch digitizers are integrated (e.g. situated behind or in front of a display such that user interaction is directly with visual feedback on the screen) with a display. In some situations, digitizers may be separate from the screen. In others they are integrated together. For instance, one type of external digitizers includes USB connected digitizers.
  2. This enumeration may include a representation of how touch is to be recognized, including enabling, disabling, or explicitly choosing a mode (such as a kiosk mode).
  b. TabletInputBroadcastType enumerates the kind of messages that the input service may send to running applications when something interesting happens (for instance, when the pen is in range of the digitizer, out of range of the digitizer, etc.).
  c. ITabletInputService provides methods an application can use to interact with the input service and/or manipulate its behavior. This may provide parity with existing control sets (including, for instance, with synchronous/asynchronous input systems, ink collection systems, and the like):
    1. A method such as RefreshFromSettings may cause the input service to re-initialize its default behavior according to settings in a central settings store (e.g. the registry)—this may be used when a control panel that allows users to manipulate timings for gestures like tap or double-tap has been used to modify changes and the user has clicked an "apply" button.
    2. A function such as QueryTabletInputTypes allows an application to quickly retrieve information about connected devices, and determine whether it makes sense to spend more time loading and initializing code that utilizes those devices. If the hardware is not present, an application can reduce its initialization time by not initializing objects that make use of the hardware that isn't present.
    3. A method like RegisterForBroadcast may allow an application to "opt-in" for receiving notifications when something interesting happens. By default these notifications may not be broadcast to all running applications for performance reasons since most applications may not do anything special with these system-wide events.
    4. A method like UnregisterForBroadcast (or equivalent) is the opposite of RegisterForBroadcast (or equivalent), and allows the application that has previously "opted in" to "opt out". It should not be necessary to call this method in order to avoid receiving broadcast notifications in the case where an application is not interested in them at all, but of course doing so may be harmless.
    5. IsInputTypeEnabled (or equivalent) may provide a shortcut means for an application to determine if any specific type of input it requires is enabled. It should provide an alternative to retrieving the full set of available input types and enumerating through them.
  d. An interface like ITabletInputBroadcastSink (or equivalent) should be implemented by an application that has registered to receive a broadcast or other message or equivalent in order to be notified of one or more "interesting" system events. When interesting events occur, the input service can walk through the registered applications and call the OnEvent method for each as appropriate (based on the specific notification).

Further, the developer may be allowed to choose the type of pathway the information should follow. For instance, a developer may be allowed to prefer all input events be treated as touch events (for example, if the system is to be used as part of a touch-sensitive kiosk). Alternatively or additionally, the developer may be allowed to specify how applications handle information pathways. For example, an application may not allow drag and drop behavior over its displayed application window. Here, the application may require that all events over its application windows be interpreted as pen input, mouse input, touch input, or combinations of these types.

One advantage to a tablet input object is that it can allow control of the system (enable/disable specific types of input pen/touch), determination of what types of inputs the system has (for example, to adjust UI elements size), and receipt of broadcasts and/or directed messages. It is noted that broadcasting messages are an optional type of pathway for conveying information. In one example, broadcasts may be different from pen/touch events in a sense that they happen regardless of whether or not the inking surface exists.

Also, aspects of the tablet may include touch-specific options. For instance, a tablet input panel (used for inking and having the ink recognized and inserted into an application) may include a finger-friendly user interface that appears when activated by a touch. Similarly, basic shell controls may behave differently to touch. For example, shell controls such as scroll bars or title grab bars may grow in size to make control of the shell via touch easier.

An application programming interface for touch may include one or more of the following:
  a. Programmatic control of when touch is enabled or disabled
  b. Differentiating mouse events generated by touch from those from a pen or mouse input. The differentiation may occur based on additional information being passed with the mouse events.
  c. Parity with existing pen messages (e.g. pen up, pen down) (that may reflect, for instance, a finger contacting a tablet and a finger being removed from a tablet).
  d. Control of touch modes (for instance, using a kiosk mode). (A kiosk mode may include a limited interface mode where user interface items are larger (for instance, larger buttons) and the user is not provided with a keyboard or mouse. Users may be constrained to full-screen applications, thereby limiting their use of the kiosk. Examples of a kiosk include automated check-in screens at an airport or gift registries in department stores.)

Touch input may be disabled over certain user interface elements. For instance, touch input may be disabled in a number of ways including but not limited to: 1) if the input is received via Windows messages, then by looking at and responding to the message's "extra info" (or equivalent), and 2) if the input is received via touch ink stream, then a) by setting a window "atom" property (one which can be queried by the message sender), b) by responding to a special message like TabletQuerySystemGestureStatus, or c) by providing information in a central store (e.g. "registry") indexed via class name or executable name.

For example, message handlers for various mouse messages may include an indication that the mouse events were created by touch. Here, for instance, one may extract the additional information using a method like GetMouseExtraInfo( ) (or the equivalent) and inspect the information for a touch signature. Once a message is determined to have been generated by touch, one can ignore the areas of the user interface unaffected by touch input.

Similarly, to make UI changes, the system may inspect mouse messages and determine if the events were the result of touch input. For instance, the system may use GetMouseExtraInfo( ) (or the equivalent) to aid in the determination. If it is determined that messages originated from a touch device, then the system may implement UI changes including, for example, larger grab handles around visual objects may be used to allow easier control of the visual objects. Also, by determining if mouse events were created by touch, touch-specific behavior may be enabled for a button that was pressed or an operation that was performed.

Touch packets may contain the same or different set of properties as compared to pen packets. For example, if different, confidence and area (indicating the area contacted) may replace or complement pen HID properties, such as tilt. Confidence possibly including a measure of the digitizer device's confidence that the contact was intentional. Low confidence may mean the contact probably was accidental or a user's palm, and high confidence may mean the contact was probably intentional or a user's finger. Also, the HID usages reported may be a subset of those pen uses. Distinct identifiers (GUIDs) may be associated with the confidence and area properties. Further, touch packets may introduce the following new properties: area (specifying the area), width/height, and pressure.

Mouse window messages generated by touch or pen may have an additional signature attached. For instance, WM_LBUTTONDOWN (the Windows message associated with left mouse button down) may include additional information. The system may use GetMessageExtraInfo( ) (or equivalent), for example, to retrieve the pen or touch signature from mouse messages.

As an example, if the signature equals 0xFF5157NN (where NN is the cursor ID), the message would be identifiable as having been generated by a pen. If the signature equals 0xFFAEA8NN (where NN is the cursor ID), the message is identifiable as having originated from a touch device. Alternatively, the signatures for may have the upper 24 bits of the 32 bit DWORD be the same for pen and touch: 0xFF5157nn. Pen and touch may be differentiated by setting bit 7 to 1 for touch, for instance. So where pen messages may typically have signatures 0xFF515700 (pen tip) and 0xFF515701 (eraser), touch messages may have signature 0xFF515780 (touch). This can be done so that a single bit check can be performed to test against both pen and touch messages, yet differentiation is also possible. This also helps with compatibility with older versions of pen input software. Using this extra information, the touch or pen-created mouse events may be placed in processing streams to be handled as mouse events.

In some environments, including tablet input systems that include synchronous and asynchronous interfaces to handle pen or mouse events, a system can determine if a notification is from a touch device by retrieving tablet context ID. For instance, a system may determine the tablet context ID, look to seek if one of the properties of the identified tablet includes the tablet's name, and checking to see if the term "touch" appears in the tablet's name property. The occurrence of the term "touch" may be a strong indication that the tablet supports touch input.

Some messages may not be relevant to touch input where there is no support in some tablets. However, some messages may be relevant to both touch input and pen input systems. For example, pen broadcast messages, cursor in range, cursor out of range, and shake may have touch equivalents with respect to some tablets.

Like a pen, touch may be used to control how gestures are interpreted over a user interface. For example, a system, using a mechanism like a TabletQuerySystemGestureStatus message (or equivalent), can set various touch gesture preferences such as tap preferred, drag preferred, and the like over parts of or all of a user interface.

Various touch modes may be enabled or disabled. For instance, a hover widget (a visual representation of when a cursor is over a specified area) can be enabled/disabled through a TabletQuerySystemGestureStatus message (or equivalent). Additionally, the system may include a mode accessible through the window message for disabling touch palm-masking. Palm-masking is the ability of the system to prevent digitizer or screen contact with a person's palm from performing unexpected operations. A benefit of an EM digitizer over a typical resistive touch digitizer is that the user is able to rest his or her palm on the screen while writing with an EM stylus. When a touch-sensitive digitizer is used, the system may desire to know how to differentiate intentional touch contact from unintentional palm contact while writing. Furthermore, in an entirely touch-enabled environment if the screen is large enough and/or the orientation of the screen favors it, the user may rest his or her palm on the screen while using a finger to touch "buttons" on the screen (for instance, a calculator application).

Touch APIs

Touch application programming interfaces permit developers to allow touch input to be used as a mouse or pen input. A number of APIs for touch are described below: exposing device kind; palm rejection and all touch enabled properties; application controlling widget appearance and disappearance; and mouse message signatures.

Exposing Device Kind

A new type of input device may be provided for computing systems that provides sensitivity to touch input, based on resistive, capacitive, or other known position-sensing technologies. Using a touch-enabled input device, the type of touch device may be exposed to a developer. For example, an operating system or an application may determine that it wants to allow touch input based on the type of input device available.

The operating system may support an ink tablet object that is able to be queried for a tablet's properties. The following is an illustrative example of a type of device type format that may be used in a COM environment or other environments.

a. The kind of tablet device may be enumerated as a mouse, pen, and/or touch device.

b. The interface IInkTablet may then be defined.

In a managed environment, a tablet object may be exposed as follows:

a. The tablet device kind may be enumerated as a mouse, pen digitizer, or touch digitizer (or other kinds of digitizer).

b. The tablet object may include a device kind property.

When using a presentation system in a tree-based rendering environment, the type of tablet device may be determined using a Device Kind property of a tablet device.

For instance, a computer system may include a module that receives a request for a type of tablet device connected to the computer system. The type of tablet device may be stored as a property accessible by the module. The module may access the storage and retrieve the property (for instance, Device Kind) and forward this information to a requester. The requester may be the operating system, an application, or a remote process. In the example of the requester being an application, the application may use the type of device to determine the type of functionality provided to a user. If the device is an active digitizer (for example, a Wacom-type digitizer that requires a stylus with a tip whose location can be determined by the digitizer), then the application may provide active pen-related functionality to a user. Active pen functionality may include functionality of hover, pressure, angle of pen, etc. If the device is a passive digitizer or touch digitizer (for example, one that determines a location of contact by resistive or capacitive determinations), then the application may provide only touch-related functionality to the user. If the device enables both stylus input using an active digitizer and touch input using a passive stylus or finger, then the application may provide both sets of functionality to the user.

Retrieving a device type property of the digitizer provides a benefit in that the operating system or application can modify the level or type of functionality provided to a user based on the device type of the digitizer. An alternative approach is to individually specify which types of functionality are supported by the digitizer. In this latter approach, it is possible that a number of different types of functionality would be common across a number of types of digitizers and therefore be duplicative. Using a single device type to allow the modification of functionality provided to a user may eliminate the need for long and complex property specifications for various digitizers.

Palm Rejection and all Touch Enabled Property

In an ideal environment for developers, users would be constrained to only using a single figure to touch a tablet surface. However, users tend to rest other fingers, their palms, or forearms on tablet surfaces. These points of contact other than a user's desired finger (or finger nail) contact can cause issues with deciding which contact location is intended. These different types of contacts can be labeled as high and low confidence contacts. For instance, when a palm (or otherwise bad contact—"low confidence contact") comes in range with the touch screen, the system by default can reject such an input (thereby preventing an application from seeing the input). However, an application can have the capability to tell to the system to pass all touch input when over an application window. For example, an application can implement a feature of erasing ink with a palm; or it can alter ink thickness based on area of contact. This can be accomplished with accessing an "allow all touch" property of a real time stylus.

Application Controlling Widget Appearance and Disappearance

In some instances, an operating system may control how a pointer associated with touch input may be displayed. Alternatively, an application may control how a pointer is displayed. For instance, a touch pointer (a.k.a. a touch widget) may be controlled not to appear on inking surfaces but controlled to show up elsewhere. An example of this behavior is that, when people are inking, a separate touch pointer or widget is more distractive than useful. However, when touch is to be used as a pointing device (like a mouse) over shells, menus, etc., having a touch pointer can be useful. An application can influence this behavior by specifying a bit or bits in an input profile for the application. In response, a system may force a touch widget to appear or not appear over a given window.

The above approach may be performed in managed code, un-managed code, and in tree-based presentation systems. This may be further specified via a property of the OS as compared to the application or in compatibility settings, for instance.

Mouse Message Signatures

An application receiving mouse messages can be capable of determining whether the messages are coming in response to interaction by pen. This enables touch-enabled applications to use touch-enhanced features while permitting non-touch enabled applications to continue to interpret touch input as a pen message (or even more simply as a mouse message). For instance, this may be done using Get Message Extra Info as an illustrative method. In an illustrative operating system, one may differentiate between pen and touch. To maintain compatibility and make applications written to pen respond to touch the same way, the signatures may be different to allow an application to differentiate the two types of input if so enabled. For instance, extra information associated with a pen event may include the number 0xFF515700. The extra information associated with a touch event may include the number 0xFF515780. By detecting which number is associated with the extra information of a pen event, a system may determine whether a pen or touch event has occurred. The following illustrative example shows how messages can be identified as originating with a touch device or a stylus device.

```
case WM_LBUTTONDOWN:
case WM_LBUTTONUP:
case WM_RBUTTONDOWN:
case WM_RBUTTONUP:
case WM_MBUTTONDOWN:
case WM_MBUTTONUP:
case WM_MOUSEMOVE:
    uint extraInfo = GetMessageExtraInfo( );
    bool fByPen    = ((extraInfo & 0xFFFFFF00) == 0xFF515700);
    bool fByTouch  = ((extraInfo & 0xFFFFFF00) == 0xFF515780);
```

Here, a pen signature is a bit superset of a touch signature.

Repurposing of Ink APIs

Ink APIs are used in current operating systems. An ink driver uses x,y input information, a tip being used, and the like (and sometimes pressure, tilt, inverted status, barrel button being pressed etc. as well) in a HID (human interface device). A touch driver may use similar data streams. Because of the similarity of data, the data streams of ink may be used for touch. This fact allows applications written for ink to also use touch input even though the applications may have been written prior to touch input having been introduced.

This common code path provides legacy support of preexisting applications or applications where developers have not considered the use of touch input as an input source. It also means that developers do not need to incorporate a new code path into applications to handle touch input. Further, by allowing applications to differentiate between touch and pen input based on extended signatures, the difference may be hidden (or ignored) when needed then used when an application wants to handle the input types differently.

Aspects of the present invention have been described in terms of preferred and illustrative embodiments thereof. Numerous other embodiments, modifications and variations within the scope and spirit of the appended claims will occur to persons of ordinary skill in the art from a review of this disclosure.

What is claimed:

1. A computer-readable storage device comprising computer executable instructions that when executed by a computing device cause said computing device to perform the instructions comprising:

receiving at a module a request for one of a number of types of input devices connected to a computer system, said request originating from a requester;

retrieving a pen or touch signature associated with said one type of input device from a storage;

forwarding said pen or touch signature associated with said one type of input device to said requester to control the type of input device functionality available to the requester where the one type of input device is identified as a pen input device or a touch input device by the pen or touch signatures of the respective input devices; and forwarding touch packets to the requester from said one type of input device in processing streams as mouse events, said touch packets including touch input data or pen input data, a corresponding touch or pen signature, and confidence data providing at least a measure of confidence of said one type of input device that inputs to said one type of input device are intentional or accidental, said confidence data representing high confidence that any number of input contacts were intentional or a user's finger or finger nail and low confidence that any number of input contacts were accidental or a user's palm,
whereby the requester differentiates data in said touch packets as pen data or touch data based on the pen or touch signatures in received touch packets.

2. The computer-readable storage device of claim 1, said one type of input device including an active digitizer input device.

3. The computer-readable storage device of claim 1, said one type of input device including a passive digitizer input device.

4. The computer-readable storage device of claim 1, said requester including an operating system.

5. The computer-readable storage device of claim 1, said requester including an application.

6. The computer-readable storage device of claim 1, said type of functionality including stylus-related functionality.

7. The computer-readable storage device of claim 1, said type of functionality including touch-related functionality.

8. The computer-readable storage device of claim 7, said type of functionality further including stylus-related functionality.

9. A computer-readable storage device comprising computer executable instructions that when executed by a computing device cause said computing device to perform the instructions comprising:
receiving at a module an indication that an application desires to receive at least one of all touch events and only high confidence touch events provided by a user's finger or finger nail at a touch input device; and
forwarding touch packets received from said touch input device for either all touch events or only high confidence touch events via an application window in processing streams as mouse events to said application based on said indication, said touch packets including touch data, a corresponding touch or pen signature, and confidence data including a contact confidence type indicator providing at least a measure of confidence of said touch input device that touch events from said touch input device are intentional or accidental, said confidence data representing high confidence that any number of touch events were intentional or a user's finger or finger nail and low confidence that any number of touch events were accidental or a user's palm for each touch event,
whereby said application differentiates touch data in said touch packets as pen data or touch data based on the pen or touch signature in received touch packets.

10. The computer-readable storage device of claim 9, said indication including a property having been set.

11. The computer-readable storage device of claim 9, said forwarding of touch packets including forwarding only high confidence touch events and rejecting low confidence touch events representing palm contacts with a digitizer.

12. A computer-readable storage device comprising computer executable instructions that when executed by a computing device cause said computing device to perform the instructions comprising:
receiving from an input device a stream of messages in the form of mouse events containing touch input data or pen input data, a pen or touch signature associated with a type of the input device, and confidence data, wherein the pen or touch signature identifies the input device as a touch input or pen input device and said confidence data provides at least a measure of confidence of said input device that input contact of said input device by a user is intentional or accidental;
determining from a received pen signature which of said messages from said input device are pen messages;
determining from a received touch signature which of said messages from said input device are touch messages; and
handling said touch messages as touch messages, said pen messages as pen messages, and remaining messages as mouse messages and accepting all such messages as input from an intentional input contact based upon the received confidence data, where the confidence data for touch and pen messages comprises high confidence that any number of input contacts were intentional or a user's finger or finger nail and low confidence that any number of input contacts were accidental or a user's palm for each message.

13. The computer-readable storage device of claim 12, said touch messages being distinguished from said pen messages based on a property of said touch messages.

14. The computer-readable storage device of claim 13, said property being a signature of said touch message.

15. The computer-readable storage device of claim 14, said signature including "0xFF515700" as a number for a pen message.

16. The computer-readable storage device of claim 14, said signature including "0xFF515780" as a number for a touch message.

* * * * *